Aug. 16, 1927.
W. C. FULKERSON
PEDAL ATTACHMENT
Filed Nov. 19, 1926
1,638,927
2 Sheets-Sheet 1
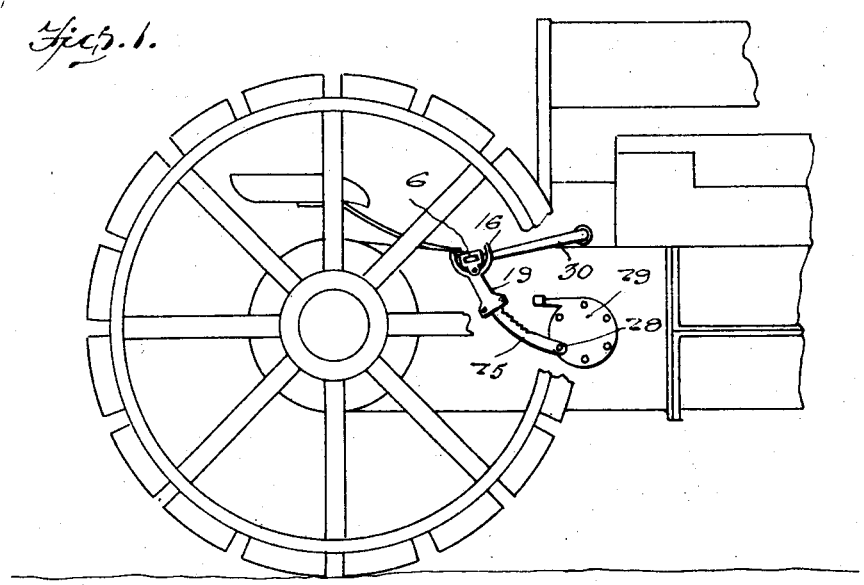
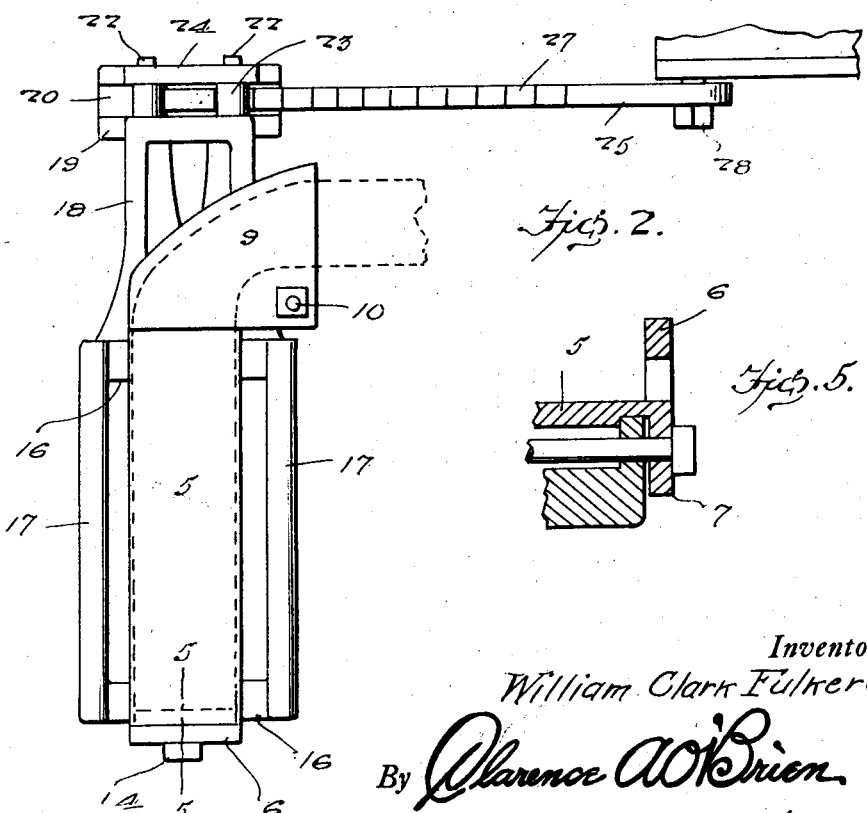
Inventor
William Clark Fulkerson
By Clarence A O'Brien
Attorney

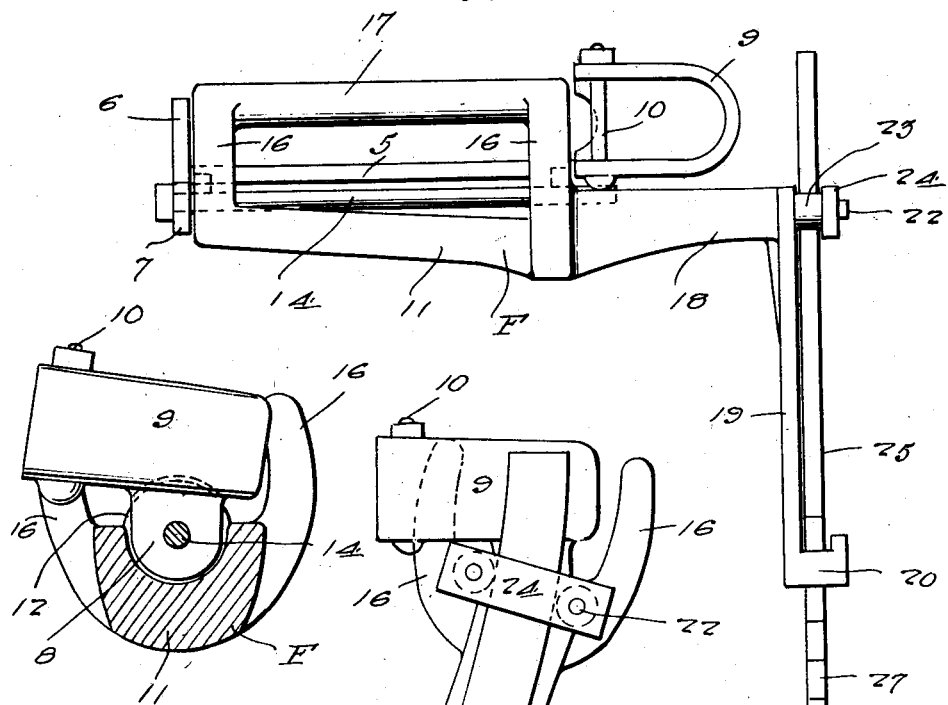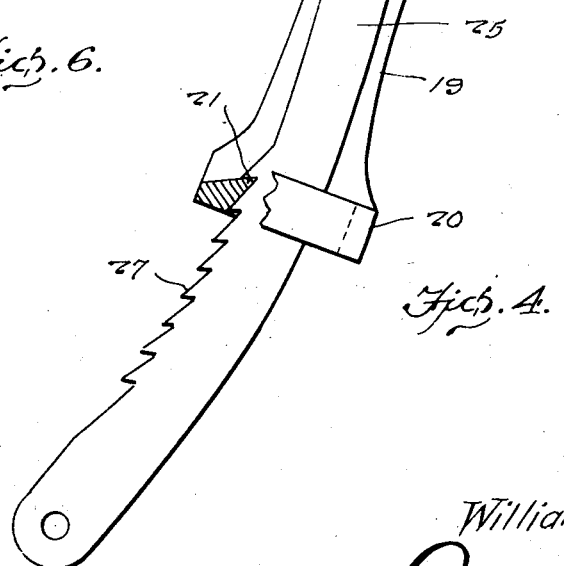

Patented Aug. 16, 1927.

1,638,927

UNITED STATES PATENT OFFICE.

WILLIAM CLARK FULKERSON, OF BUECHEL, KENTUCKY.

PEDAL ATTACHMENT.

Application filed November 19, 1926. Serial No. 149,513.

The present invention relates to a pedal attachment particularly adapted for use with the clutch pedal or brake pedal of a Fordson tractor or the like.

The important object of the invention is to provide an attachment of this nature having means incorporated therein whereby the pedal may be held in a depressed position capable of easy and ready release when desired.

A still further very important object of the invention lies in the provision of an attachment of this nature which is exceedingly simple in its construction, inexpensive to manufacture, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of a tractor showing my attachment associated with the clutch pedal thereof, Fig. 2 is a top plan view of the attachment, Fig. 3 is a front elevation thereof, Fig. 4 is a side elevation thereof, Fig. 5 is a detail section taken substantially on the line 5—5 of Fig. 2, Fig. 6 is a sectional side elevation of the attachment.

Referring to the drawings in detail, it will be seen that the numeral 5 denotes a plate having a slotted ear 6 rising from one end and an apertured lug 7 depending from the same end. An apertured lug 8 depends from the other end of the plate 5. The last mentioned end of the flange merges into an extension 9 which is bent over and upwardly upon itself and the corners thereof are pierced by a bolt 10. This extension forms a clamp for receiving the curved shank portion of the pedal, the treadle of the pedal resting on the plate 5 and the usual extremity thereof passing through the slotted ear 6. A frame F comprises a body 11 having spaced apertured lugs 12 arising therefrom one for each lug 7, 8. These lugs 7, 8 and 12 have extended through their registering openings a pivot bolt 14. A pair of arcuate arms 16 is mounted at each end of the body 11 and the respective ends of the pairs of arms 16 are connected by bars 17 which are disposed above the plate 5 as is clearly indicated in Fig. 3 of the drawings. An extension 18 is formed on the body 11 and preferably merges therefrom. A bar 19 depends from the extremities of the extension 18 terminating in a slotted head 20 having a ratchet tooth 21. Pins 22 extend in spaced relation from the upper end of the bar 19 and have rollers 23 journaled thereon and held in place by a plate 24. A curved shank 25 pierces the slot of the head 20 and the upper end thereof extends between the rollers 23. One edge of the shank 25 is provided with a series of ratchet teeth 27 for cooperating with the ratchet tooth 21. The lower end of the shank 25 is adapted to be pivotally mounted in any suitable manner such as by one of the bolts 28 holding the cover plate 29 in place on the Fordson tractor shown in Fig. 1. It will thus be seen that when the pedal 30 is depressed to let out the clutch it may be held in such a position because of the engagement of the ratchet tooth 21 with one of the ratchet teeth 27. In order to release the tooth 21 it is only necessary to rock the frame F, referring to Fig. 4, in a clockwise direction.

It is thought that the construction, operation, and utility of this invention will now be clearly understood without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An attachment of the class described including, in combination, a member having means incorporated therein whereby the same may be attached to a pedal, a frame comprising a body, a pair of arcuate arms at each end thereof, bars connecting the respective arms of the two pairs of arms, said bars being situated above the member, a shank, means for pivotally mounting the shank, and ratchet connecting means between the shank and the frame.

2. An attachment of the class described including, in combination, a member having means incorporated therein whereby the same may be attached to a pedal, a frame comprising a body, a pair of arcuate arms at each end thereof, bars connecting the respective arms of the two pairs of arms, said bars being situated above the member, a bar extending laterally from the frame and terminating in a slotted head having a ratchet therein, a pair of pins projecting from the last-mentioned bar remote from the head, rollers journaled on the pins, a shank extending through the slotted head and between the rollers, means for pivotally mounting the shank at one end, said shank being provided on one edge with a plurality of ratchet teeth to cooperate with the first-mentioned ratchet tooth.

In testimony whereof I affix my signature.

WILLIAM CLARK FULKERSON.